United States Patent
Yamanaka et al.

(10) Patent No.: US 9,991,766 B2
(45) Date of Patent: Jun. 5, 2018

(54) VALVE-TIMING CONTROL APPARATUS FOR INTERNAL COMBUSTION ENGINE AND POWER-FEEDING MECHANISM USED IN VALVE-TIMING CONTROL APPARATUS

(71) Applicant: HITACHI AUTOMOTIVE SYSTEMS, LTD., Hitachinaka-shi, Ibaraki (JP)

(72) Inventors: Atsushi Yamanaka, Atsugi (JP); Ryo Tadokoro, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 136 days.

(21) Appl. No.: 14/288,732

(22) Filed: May 28, 2014

(65) Prior Publication Data
US 2015/0008774 A1   Jan. 8, 2015

(30) Foreign Application Priority Data
Jul. 4, 2013   (JP) ................. 2013-140285

(51) Int. Cl.
*H02K 11/00*   (2016.01)
*F01L 1/352*   (2006.01)
(Continued)

(52) U.S. Cl.
CPC .......... *H02K 11/0094* (2013.01); *F01L 1/352* (2013.01); *H02K 7/14* (2013.01);
(Continued)

(58) Field of Classification Search
CPC .... H02K 11/0094; H02K 7/075; H02K 11/00; H02K 11/026; H02K 11/075; H02K 7/14; H02K 7/145
(Continued)

(56) References Cited

U.S. PATENT DOCUMENTS

| | | | | | |
|---|---|---|---|---|---|
| 1,342,583 | A | * | 6/1920 | Borger | H01R 39/38 310/239 |
| 2,209,361 | A | * | 7/1940 | Sutherland | H02K 5/141 310/239 |

(Continued)

FOREIGN PATENT DOCUMENTS

| | | |
|---|---|---|
| JP | S60-184286 U | 12/1985 |
| JP | S60-186876 U | 12/1985 |

(Continued)

OTHER PUBLICATIONS

IP.com NPL and Patent Search IQQueryQuickExport—201710101212.*

*Primary Examiner* — Bernard Rojas
*Assistant Examiner* — Maged Almawri
(74) *Attorney, Agent, or Firm* — Foley & Lardner LLP

(57) ABSTRACT

A valve-timing control apparatus includes a motor housing formed with an accommodating space; a permanent magnet provided along an inner circumference of the accommodating space of the motor housing; a rotor configured to rotate relative to the permanent magnet; a transmitting mechanism configured to transmit a rotational force of the rotor to a cam shaft; a switching brush mounted on the motor housing and configured to switch an energization of coil; a power-feeding brush provided to one of the motor housing and a fixed member and configured to feed electric power to the switching brush; a slip ring provided to another of the motor housing and the fixed member and being in contact with the power-feeding brush; a pigtail harness connecting the power-feeding brush with a power-feeding terminal; and contact portions bending the pigtail harness at a plurality of spots of the pigtail harness by contact with the pigtail harness.

9 Claims, 7 Drawing Sheets

(51) Int. Cl.
*F01L 13/00* (2006.01)
*H02K 5/14* (2006.01)
*H02K 7/14* (2006.01)

(52) U.S. Cl.
CPC ..... *F01L 2013/103* (2013.01); *F01L 2101/00* (2013.01); *F01L 2250/02* (2013.01); *F01L 2810/02* (2013.01); *F01L 2820/032* (2013.01); *H02K 5/14* (2013.01); *H02K 7/145* (2013.01)

(58) Field of Classification Search
USPC .................................. 310/71, 239–253, 238
See application file for complete search history.

(56) References Cited

U.S. PATENT DOCUMENTS

| | | | | |
|---|---|---|---|---|
| 2,755,399 A * | 7/1956 | Phillips | ................. | H01R 39/39 310/239 |
| 4,673,836 A * | 6/1987 | Akiyama | ............... | H01R 39/40 310/239 |
| 4,748,356 A * | 5/1988 | Okashiro | ............... | H02K 5/148 310/43 |
| 5,148,073 A * | 9/1992 | Tamura | ................ | H01R 39/383 310/239 |
| 5,159,222 A * | 10/1992 | Southall | ............... | H01R 13/415 29/597 |
| 5,248,910 A * | 9/1993 | Yockey | .................. | H02K 19/36 310/239 |
| 5,717,271 A * | 2/1998 | Aoki | ....................... | H01R 39/38 310/239 |
| 5,977,669 A * | 11/1999 | Yoshida | ................. | H02K 5/141 310/68 D |
| 6,104,110 A * | 8/2000 | Uchida | ................ | H02K 11/026 310/239 |
| 6,745,865 B2 * | 6/2004 | Hama | .................... | H02K 5/148 180/444 |
| 8,482,170 B2 * | 7/2013 | Tsubakimoto | ......... | H02K 11/25 310/239 |
| 8,752,515 B2 | 6/2014 | Yamanaka et al. | | |
| 2003/0230952 A1 * | 12/2003 | Inoue | ..................... | H01R 39/40 310/242 |
| 2004/0012295 A1 * | 1/2004 | Takahashi | .............. | H01R 39/41 310/239 |
| 2004/0189116 A1 * | 9/2004 | Hama | .................... | H02K 5/148 310/71 |
| 2004/0201295 A1 * | 10/2004 | Hama | .................. | H01R 39/383 310/71 |
| 2004/0201296 A1 * | 10/2004 | Hama | .................. | H01R 39/383 310/71 |
| 2008/0174201 A1 * | 7/2008 | Cavallo | .................. | H02K 5/148 310/242 |
| 2008/0309181 A1 * | 12/2008 | Nakano | .................... | H02K 5/10 310/88 |
| 2010/0269770 A1 * | 10/2010 | Kokubo | .................. | F01L 1/022 123/90.15 |
| 2011/0253085 A1 * | 10/2011 | Kokubo | .................. | F01L 1/352 123/90.17 |
| 2011/0265747 A1 * | 11/2011 | Tadokoro | ................ | F01L 1/344 123/90.15 |

FOREIGN PATENT DOCUMENTS

JP 2012-132367 A 7/2012
JP 2012-251537 A 12/2012

* cited by examiner

VALVE-TIMING CONTROL APPARATUS FOR INTERNAL COMBUSTION ENGINE AND POWER-FEEDING MECHANISM USED IN VALVE-TIMING CONTROL APPARATUS

BACKGROUND OF THE INVENTION

The present invention relates to a valve-timing control apparatus for an internal combustion engine, in which opening and closing timings of an intake valve and/or an exhaust valve are controlled, and relates to a power-feeding mechanism that is used in the valve-timing control apparatus.

Recently, a valve-timing control apparatus is proposed in which opening and closing timings of an intake or an exhaust valve are controlled by transmitting rotative force of an electric motor through a speed-reduction mechanism to a cam shaft and thereby varying a relative rotational phase of the cam shaft to a sprocket to which rotative force is transmitted from a crankshaft.

Japanese Patent Application Publication No. 2012-132367 discloses a previously-proposed valve-timing control apparatus. In this technique, electric current supplied through a pigtail harness from a battery is supplied to the electric motor by way of power-feeding brush and slip ring only when varying a valve timing, in order to reduce power consumption as much as possible.

SUMMARY OF THE INVENTION

However, in the above previously-proposed valve-timing control apparatus, alternating torque is caused at the cam shaft due to spring force of a valve spring of the intake valve or the like. A relatively large vibration produced by this alternating torque is transmitted through the slip ring and the power-feeding brush to the pigtail harness. Hence, there is a risk that a stress concentration is caused at a part of the pigtail harness so that a durability of the pigtail harness is reduced.

In order to relax the stress concentration of the pigtail harness, a length of the pigtail harness is set to be relatively long.

However, in the case that the pigtail harness has a long length, there is a risk that the power-feeding brush gets out and drops out from a retaining portion for slidably retaining the power-feeding brush, for example when the power-feeding brush is installed. As a result, an operating efficiency (task performance) for assembly of respective structural members is reduced.

It is an object of the present invention to provide a valve-timing control apparatus for an internal combustion engine, devised to easily assemble the respective structural members such as the power-feeding brush while securing the durability of the pigtail harness.

According to one aspect of the present invention, there is provided a valve-timing control apparatus for an internal combustion engine, comprising: a drive rotating member configured to receive a rotational force from a crankshaft; a motor housing fixed to the drive rotating member and formed with an accommodating space therein; a permanent magnet provided along an inner circumference of the accommodating space of the motor housing, the permanent magnet having a plurality of magnetic poles in a circumferential direction thereof; a rotor provided inside the permanent magnet and configured to rotate relative to the permanent magnet, wherein a coil is wound on the rotor and is configured to form a plurality of magnetic poles in a circumferential direction of the rotor by energization; a transmitting mechanism configured to transmit a rotational force of the rotor to a cam shaft; a switching brush mounted on the motor housing and configured to switch the energization of the coil; a power-feeding brush provided to to one of the motor housing and a fixed member and configured to feed electric power to the switching brush; a slip ring provided to another of the motor housing and the fixed member, the power-feeding brush being in contact with the slip ring; a pigtail harness connecting the power-feeding brush with a power-feeding terminal; and contact portions bending the pigtail harness at a plurality of spots of the pigtail harness by contact with the pigtail harness.

According to another aspect of the present invention, there is provided a valve-timing control apparatus for an internal combustion engine, wherein a valve timing of the internal combustion engine is varied by energizing an electric motor by way of a slip ring and a power-feeding brush, the valve-timing control apparatus comprising: a retaining member retaining the power-feeding brush to allow the power-feeding brush to slide relative to the retaining member; and a pigtail harness electrically connecting the power-feeding brush with a connection terminal, wherein the retaining member is formed with a contact portion, one end portion of the pigtail harness is connected with the power-feeding brush, and another end portion of the pigtail harness is wound around an external surface of the contact portion and is connected with the connection terminal.

According to still another aspect of the present invention, there is provided a power-feeding mechanism used in a valve-timing control apparatus for an internal combustion engine, wherein the valve-timing control apparatus includes a power-feeding brush configured to move in an axial direction such that a tip portion of the power-feeding brush become in contact with a slip ring, wherein a valve timing of the internal combustion engine is varied by drivingly rotating an electric motor by means of power supply from the slip ring, the power-feeding mechanism comprising: a retaining member retaining the power-feeding brush therein to allow the power-feeding brush to slide relative to the retaining member; a protruding portion formed to extend from an outside surface of the retaining member in a sliding direction of the power-feeding brush; and a pigtail harness, wherein one end portion of the pigtail harness is connected with the power-feeding brush, wherein another end portion of the pigtail harness passes through an inside of the retaining member and an external surface of the protruding portion and is connected with a connection terminal.

The other objects and features of this invention will become understood from the following description with reference to the accompanying drawings.

DETAILED DESCRIPTION OF THE INVENTION

Figure 1:
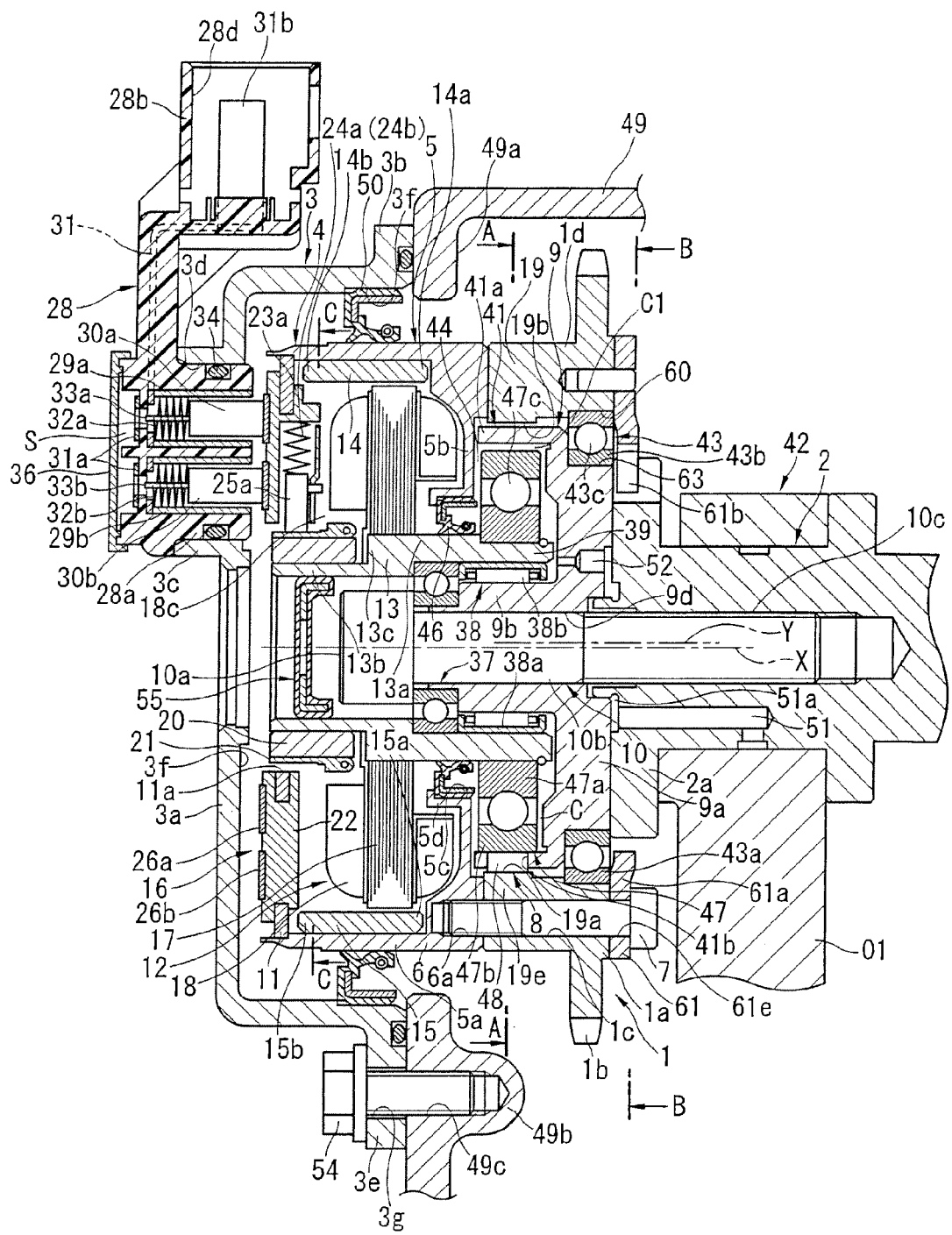
FIG. 1 is a longitudinal sectional view of a valve-timing control apparatus in an embodiment according to the present invention.

Hereinafter, embodiments of valve-timing control (VTC) apparatus for an internal combustion engine or power-feeding mechanism used in the valve-timing control apparatus according to the present invention will be explained referring to the drawings.

Figure 2:
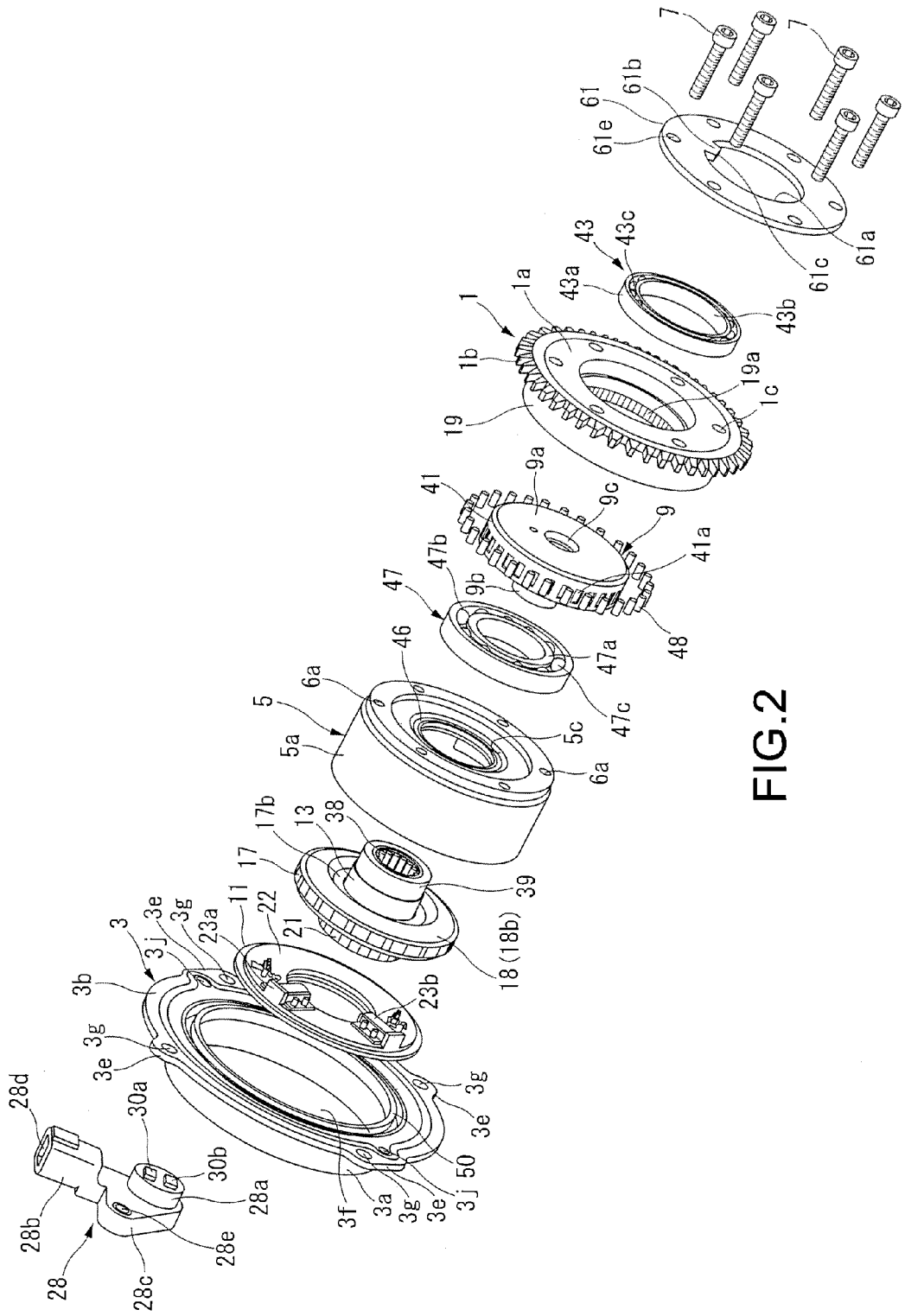
FIG. 2 is an exploded oblique perspective view showing structural elements in the embodiment.

As shown in FIGS. 1 and 2, a valve-timing control apparatus includes a timing sprocket 1, a cam shaft 2, a cover member 3 and a phase change mechanism 4. The timing sprocket 1 (functioning as a drive rotating member) is rotated and driven by a crankshaft of the internal combustion engine. The cam shaft 2 is rotatably supported on a cylinder head 01 through a bearing 42, and is rotated by a rotational force transmitted from the timing sprocket 1. The cover member 3 is provided on a front side (in an axially frontward direction) of the timing sprocket 1, and is fixedly attached to a chain cover 49. The phase change mechanism 4 is provided between the timing sprocket 1 and the cam shaft 2, and is configured to change a relative rotational phase between the timing sprocket 1 and the cam shaft 2 in accordance with an operating state of the engine.

Whole of the timing sprocket 1 is integrally formed of an iron-based metal in an annular shape. The timing sprocket 1 includes a sprocket main body 1a, a gear portion 1b and an internal-teeth constituting portion (internal-gear portion) 19. An inner circumferential surface of the sprocket main body 1a is formed in a stepped shape to have two relatively large and small diameters as shown in FIG. 1. The gear portion 1b is formed integrally with an outer circumference of the sprocket main body 1a, and receives rotational force through a wound timing chain (not shown) from the crankshaft. The internal-teeth constituting portion 19 is formed integrally with a front end portion of the sprocket main body 1a.

A large-diameter ball bearing 43 which is a bearing having a relatively large diameter is interposed between the sprocket main body 1a and an after-mentioned follower member 9 provided on a front end portion of the cam shaft 2. The timing sprocket 1 is rotatably supported by the cam shaft 2 through the large-diameter ball bearing 43 such that a relative rotation between the cam shaft 2 and the timing sprocket 1 is possible.

The large-diameter ball bearing 43 includes an outer race 43a, an inner race 43b, and a ball(s) 43c interposed between the outer race 43a and the inner race 43b. The outer race 43a of the large-diameter ball bearing 43 is fixed to an inner circumferential portion (i.e., inner circumferential surface) of the sprocket main body 1a whereas the inner race 43b of the large-diameter ball bearing 43 is fixed to an outer circumferential portion (i.e., outer circumferential surface) of the follower member 9.

The inner circumferential portion of the sprocket main body 1a is formed with an outer-race fixing portion 60 which is in an annular-groove shape as obtained by cutting out a part of the inner circumferential portion of the sprocket main body 1a. The outer-race fixing portion 60 is formed to be open toward the cam shaft 2.

The outer-race fixing portion 60 is formed in a stepped shape to have two relatively large and small diameters. The outer race 43a of the large-diameter ball bearing 43 is fitted into the outer-race fixing portion 60 by press fitting in an axial direction of the timing sprocket 1. Thereby, one axial end of the outer race 43a is placed at a predetermined position, that is, a positioning of the outer race 43a is performed.

The internal-teeth constituting portion 19 is formed integrally with an outer circumferential side of the front end portion of the sprocket main body 1a. The internal-teeth constituting portion 19 is formed in a cylindrical shape (circular-tube shape) extending in a frontward direction of the phase change mechanism 4. An inner circumference of the internal-teeth constituting portion 19 is formed with internal teeth (internal gear) 19a which function as a wave-shaped meshing portion.

Moreover, a female-thread constituting portion 6 formed integrally with an after-mentioned motor housing 5 is placed to face a front end portion of the internal-teeth constituting portion 19. The female-thread constituting portion 6 is formed in an annular shape.

Moreover, an annular retaining plate 61 is disposed on a (axially) rear end portion of the sprocket main body 1a, on the side opposite to the internal-teeth constituting portion 19. This retaining plate 61 is integrally formed of metallic sheet material. As shown in FIG. 1, an outer diameter of the retaining plate 61 is approximately equal to an outer diameter of the sprocket main body 1a. An inner diameter of the retaining plate 61 is smaller than an inner diameter of the outer race 43a of the large-diameter ball bearing 43. An inner circumferential portion 61a of the retaining plate 61 is in contact with an axially outer end surface of the outer race 43a. Moreover, a stopper convex portion 61b which protrudes in a radially-inner direction of the annular retaining plate 61, i.e. protrudes toward a central axis of the annular retaining plate 61 is provided at a predetermined location of an inner circumferential edge (i.e., radially-inner edge) of the inner circumferential portion 61a. This stopper convex portion 61b is formed integrally with the inner circumferential portion 61a.

Figure 6:
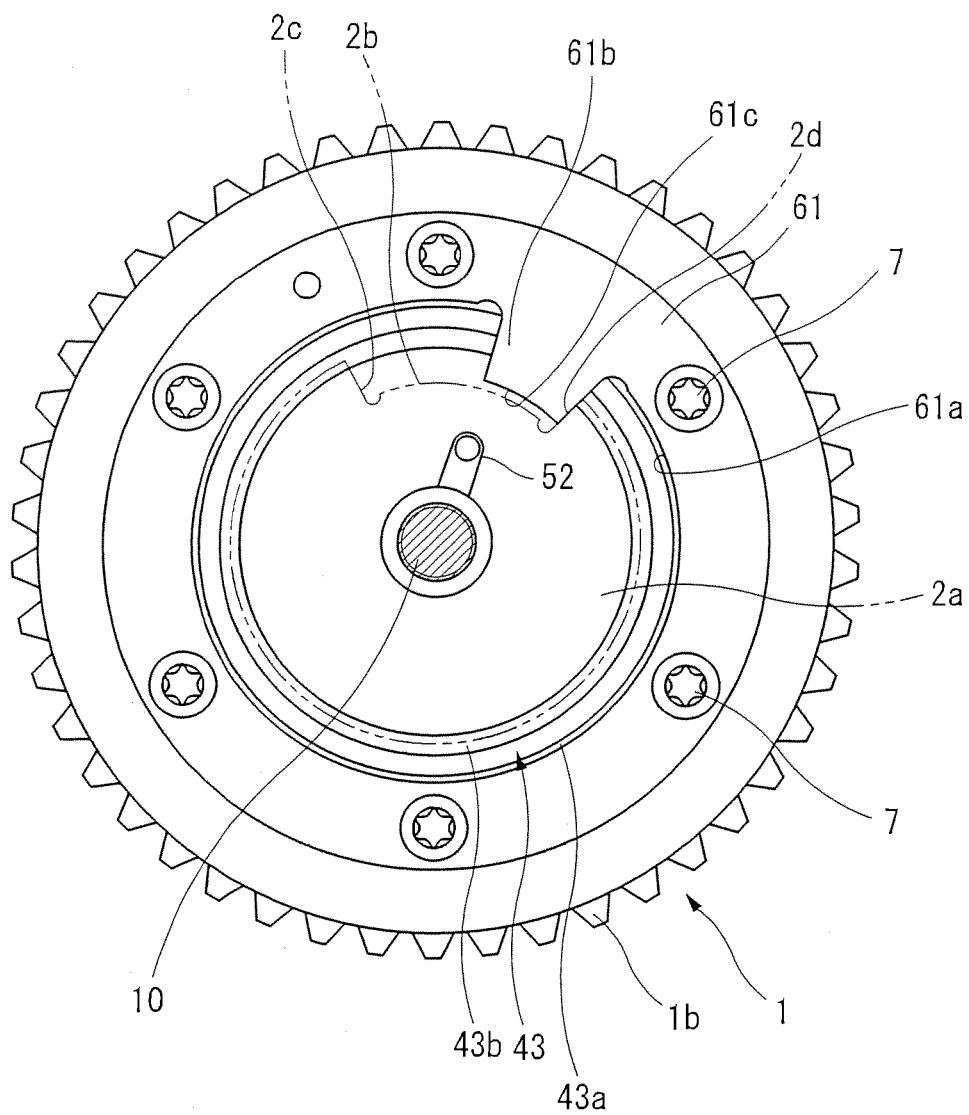
FIG. 6 is a sectional view of FIG. 1, taken along a line B-B.

As shown in FIGS. 1 and 6, the stopper convex portion 61b is formed in a substantially fan shape. A tip edge 61c of the stopper convex portion 61b is formed in a circular-arc shape in cross section, along a circular-arc-shaped inner circumferential surface of an after-mentioned stopper groove 2b. Moreover, an outer circumferential portion of the retaining plate 61 is formed with six bolt insertion holes 61e each of which passes through the retaining plate 61. The six bolt insertion holes 61e are formed at circumferentially equally-spaced intervals in the outer circumferential portion of the retaining plate 61. A bolt 7 is inserted through each of the six bolt insertion holes 61e.

An outer circumferential portion of the sprocket main body is (the internal-teeth constituting portion 19) is formed with six bolt insertion holes is each of which axially passes through the timing sprocket 1a. The six bolt insertion holes 1c are formed substantially at circumferentially equally-spaced intervals in the outer circumferential portion of the sprocket main body 1a. Moreover, the female-thread constituting portion 6 is formed with six female threaded holes 6a at its portions respectively corresponding to the six bolt insertion holes 1c and the six bolt insertion holes 61e. By the six bolts 7 inserted into the six bolt insertion holes 61e, the six bolt insertion holes 1c and the six female threaded holes 6a; the timing sprocket 1a, the retaining plate 61 and the motor housing 5 are jointly fastened to one another from the axial direction.

It is noted that the sprocket main body 1a and the internal-teeth constituting portion 19 function as a casing for an after-mentioned speed-reduction mechanism 8.

The timing sprocket 1a, the internal-teeth constituting portion 19, the retaining plate 61 and the female-thread constituting portion 6 have outer diameters substantially equal to one another.

As shown in FIG. 1, the chain cover 49 is fixed to a front end portion of a cylinder block (not shown) and the cylinder head 01 which constitute a main body of the engine. The chain cover 49 is disposed along an upper-lower direction to cover a chain (not shown) wound around the timing sprocket 1a. The chain cover 49 is formed with an opening portion at a location corresponding to the phase change mechanism 4. An annular wall 49a constituting the opening portion of the chain cover 49 is formed with four boss portions 49b. The four boss portions 49b are formed integrally with the annular wall 49a and are located at circumferential four spots of the annular wall 49a. A female threaded hole 49c is formed in the annular wall 49a and each boss portion 49b to pass through the annular wall 49a and reach an interior of the each boss portion 49b. That is, four female threaded holes 49c corresponding to the four boss portions 49b are formed.

As shown in FIGS. 1 and 2, the cover member 3 is made of aluminum alloy material and is integrally formed in a cup shape. The cover member 3 is provided to face and cover a front end portion of the motor housing 5. The cover member 3 includes a cover main body 3a and a mounting flange 3b. The cover main body 3a bulges out in the cup shape (protrudes in an expanded state) frontward in the axial direction. The mounting flange 3b is in an annular shape (ring shape) and is formed integrally with an outer circumferential edge of an opening-side portion of the cover main body 3a. Moreover, an outer circumferential portion of the cover main body 3a is formed with a cylindrical wall 3c extending in the axial direction. That is, the cylindrical wall 3c is formed integrally with the cover main body 3a and includes a retaining hole 3d therein. A part of an after-mentioned retaining member 28 is fitted into and held by an inner circumferential surface of the retaining hole 3d.

The mounting flange 3b includes four boss portions 3e. The four boss portions 3e are formed substantially at circumferentially equally-spaced intervals (approximately at every 90-degree location) on the mounting flange 3b. As shown in FIG. 1, each boss portion 3e is formed with a bolt insertion hole 3g. The bolt insertion hole 3g passes through the boss portion 3e. Each bolt 54 is inserted through the bolt insertion hole 3g and is screwed in the female threaded hole 49c formed in the chain cover 49. By these bolts 54, the cover member 3 is fixed to the chain cover 49.

As shown in FIG. 1, an oil seal 50 which is a seal member having a large diameter is interposed between an outer circumferential surface of the motor housing 5 and an inner circumferential surface of a stepped portion (multilevel portion) of outer circumferential side of the cover main body 3a. The large-diameter oil seal 50 is formed in a substantially U-shape in cross section, as shown in FIG. 1. A core metal is buried inside a base material formed of synthetic rubber. An annular base portion of outer circumferential side of the large-diameter oil seal 50 is fixedly fitted in a stepped annular portion (annular groove) 3f formed in the inner circumferential surface of the cover member 3.

As shown in FIG. 1, the motor housing 5 includes a housing main body 5a and a sealing plate 11. The housing main body 5a is formed in a tubular shape having its bottom by press molding. The housing main body 5a is formed of iron-based metal. The sealing plate 11 is formed of non-magnetic synthetic resin, and seals a front-end opening of the housing main body 5a.

The housing main body 5a includes a dividing wall 5b at a rear end portion of the housing main body 5a. The dividing wall 5b is formed in a circular-disk shape. Moreover, the dividing wall 5b is formed with a shaft-portion insertion hole 5c having a large diameter, at a substantially center of the dividing wall 5b. An after-mentioned eccentric shaft portion 39 is inserted through the shaft-portion insertion hole 5c. A hole edge of the shaft-portion insertion hole 5c is formed integrally with an extending portion (exiting portion) 5d which protrudes from the dividing wall 5b in the axial direction of the cam shaft 2 in a cylindrical-tube shape. Moreover, an outer circumferential portion of a front-end surface of the dividing wall 5b is formed integrally with the female-thread constituting portion 6.

The cam shaft 2 includes two drive cams per one cylinder of the engine. Each drive cam is provided on an outer circumference of the cam shaft 2, and functions to open an intake valve (not shown). The front end portion of the cam shaft 2 is formed integrally with a flange portion 2a.

As shown in FIG. 1, an outer diameter of the flange portion 2a is designed to be slightly larger than an outer diameter of an after-mentioned fixing end portion 9a of the follower member 9. An outer circumferential portion of a front end surface of the flange portion 2a is in contact with an axially outer end surface of the inner race 43b of the large-diameter ball bearing 43, after an assembly of respective structural components. Moreover, the front end surface of the flange portion 2a is fixedly connected with the follower member 9 from the axial direction by a cam bolt 10 under a state where the front end surface of the flange portion 2a is in contact with the follower member 9 in the axial direction.

As shown in FIG. 6, an outer circumference of the flange portion 2a is formed with a stopper concave groove 2b into which the stopper convex portion 61b of the retaining plate 61 is inserted and engaged. The stopper concave groove 2b is formed along a circumferential direction of the flange portion 2a. (A bottom surface of) The stopper concave groove 2b is formed in a circular-arc shape in cross section when taken by a plane perpendicular to the axial direction of the cam shaft 2. The stopper concave groove 2b is formed in an outer circumferential surface of the flange portion 2a within a predetermined range given in a circumferential direction of the cam shaft 2. The cam shaft 2 rotates within this circumferential range relative to the sprocket main body is so that one of both end edges of the stopper convex portion 61b becomes in contact with the corresponding one of circumferentially-opposed edges 2c and 2d of the stopper concave groove 2b. Thereby, a relative rotational position of the cam shaft 2 to the timing sprocket 1 is restricted between a maximum advanced side and a maximum retarded side.

The stopper convex portion 61b is disposed axially away toward the cam shaft 2 from a point at which the outer race 43a of the large-diameter ball bearing 43 is pressed by the spacer 62 for fixing the outer race 43a in the axial direction. Accordingly, the stopper convex portion 61b is not in contact with the fixing end portion 9a of the follower member 9 in the axial direction. Therefore, an interference between the stopper convex portion 61b and the fixing end portion 9a can be sufficiently suppressed.

The stopper convex portion 61b and the stopper concave groove 2b constitute a stopper mechanism.

As shown in FIG. 1, the cam bolt 10 includes a head portion 10a and a shaft portion 10b. An end surface of the head portion 10a which is located on the side of the shaft portion 10b supports an inner race of a small-diameter ball bearing 37 in the radial direction of the cam bolt 10. An outer circumference of the shaft portion 10b includes a male thread portion 10c which is screwed into a female threaded portion of the cam shaft 2. The female threaded portion of the cam shaft 2 is formed from the end portion of the cam shaft 2 toward an inside of the cam shaft 2 in the axial direction.

The follower member 9 which functions as a driven rotating member is integrally formed of an iron-based metal. As shown in FIG. 1, the follower member 9 includes the fixing end portion 9a, a cylindrical portion (circular tube portion) 9b and a cylindrical retainer 41. The fixing end portion 9a is in a circular-plate shape and is formed in a rear end side (a cam-shaft-side portion) of the follower member 9. The cylindrical portion 9b protrudes in the axial direction from a front end of an inner circumferential portion of the fixing end portion 9a. The retainer 41 is formed integrally with an outer circumferential portion of the fixing end portion 9a, and retains or guides a plurality of rollers 48.

A rear end surface of the fixing end portion 9a is in contact with the front end surface of the flange portion 2a of the cam shaft 2. The fixing end portion 9a is pressed and fixed to the flange portion 2a in the axial direction by an axial force of the cam bolt 10.

As shown in FIG. 1, the cylindrical portion 9b is formed with an insertion hole 9d passing through a center of the cylindrical portion 9b in the axial direction. The shaft portion 10b of the cam bolt 10 is passed through the insertion hole 9d. Moreover, a needle bearing 38 functions as a bearing member is provided on an outer circumferential side of the cylindrical portion 9b.

As shown in FIG. 1, the retainer 41 is formed in a cylindrical shape (circular-tube shape) having its bottom and protruding from the bottom in the extending direction of the cylindrical portion 9b. The retainer 41 is forwardly bent in a substantially L-shape in cross section from a front end of the outer circumferential portion of the fixing end portion 9a.

A tubular tip portion 41a of the retainer 41 extends and exits through an accommodating space 44 toward the dividing wall 5b of the motor housing 5. The accommodating space 44 is formed in an annular concave shape between the female-thread constituting portion 6 and the extending portion 5d. Moreover, as shown in FIGS. 1 and 2, a plurality of roller-retaining holes 41b are formed in the tubular tip portion 41a substantially at circumferentially equally-spaced intervals. Each of the plurality of roller-retaining holes 41b is formed in a substantially rectangular shape in cross section, and retains the roller 48 to allow a rolling movement of the roller 48. The total number of the roller-retaining holes 41b (or the total number of the rollers 48) is smaller by one than the total number of the internal teeth 19a of the internal-teeth constituting portion 19.

An inner-race fixing portion 63 is formed in a cut-out manner between the outer circumferential portion of the fixing end portion 9a and a bottom-side connecting portion of the retainer 41. The inner-race fixing portion 63 fixes or fastens the inner race 43b of the large-diameter ball bearing 43.

The inner-race fixing portion 63 is formed by cutting the follower member 9 in a stepped manner (multilevel manner) such that the inner-race fixing portion 63 faces the outer-race fixing portion 60 in the radial direction. The inner-race fixing portion 63 includes an outer circumferential surface and a stepped surface (multilevel-linking surface). The outer circumferential surface is in an annular shape (tubular shape) extending in the axial direction of the cam shaft 2. The stepped surface is formed integrally with the outer circumferential surface on a side opposite to an opening of the outer circumferential surface, and extends in the radial direction. The inner race 43b of the large-diameter ball bearing 43 is fitted into the outer circumferential surface in the axial direction by means of press fitting. Thereby, an inner end surface of the press-fitted inner race 43b becomes in contact with the stepped surface, so that an axial positioning of the inner race 43b is done.

The phase change mechanism 4 mainly includes an electric motor 12 and the speed-reduction mechanism 8. The electric motor 12 is disposed on a front end side of the cylindrical portion 9b of the follower member 9. The speed-reduction mechanism 8 functions to reduce a rotational speed of the electric motor 12 and to transmit the reduced rotational speed to the cam shaft 2.

As shown in FIGS. 1 and 2, the electric motor 12 is a brush DC motor. The electric motor 12 is constituted by the motor housing 5, a motor output shaft 13, a pair of permanent magnets 14 and 15, and a stator 16. The motor housing 5 is a yoke which rotates integrally with the timing sprocket 1. The motor output shaft 13 is arranged inside the motor housing 5 to be rotatable relative to the motor housing 5. The pair of permanent magnets 14 and 15 are fixed to an inner circumferential surface of the motor housing 5. Each of the pair of permanent magnets 14 and 15 is formed in a half-round arc shape. The stator 16 is fixed to the sealing plate 11.

The motor output shaft 13 is formed in a stepped tubular shape (in a cylindrical shape having multileveled surface), and functions as an armature. The motor output shaft 13 includes a large-diameter portion 13a, a small-diameter portion 13b, and a stepped portion (multilevel-linking portion) 13c. The stepped portion 13c is formed at a substantially axially center portion of the motor output shaft 13, and is a boundary between the large-diameter portion 13a and the small-diameter portion 13b. The large-diameter portion 13a is located on the side of the cam shaft 2 whereas the small-diameter portion 13b is located on the side of the retaining member 28. An iron-core rotor 17 is fixed to an outer circumference of the large-diameter portion 13a. The eccentric shaft portion 39 constituting a part of the speed-reduction mechanism 8 is formed integrally with a rear end portion of the large-diameter portion 13a.

On the other hand, an annular member (tubular member) 20 is fitted over and fixed to an outer circumference of the small-diameter portion 13b by press fitting. A commutator 21 is fitted over and fixed to an outer circumferential surface of the annular member 20 by means of press fitting in the axial direction. Hence, an outer surface of the stepped portion 13c performs an axial positioning of the annular member 20 and the commutator 21. An outer diameter of the annular member 20 is substantially equal to an outer diameter of the large-diameter portion 13a. An axial length of the annular member 20 is slightly shorter than an axial length of the small-diameter portion 13b.

Lubricating oil is supplied to an inside space of the motor output shaft 13 and the eccentric shaft portion 39 in order to lubricate the bearings 37 and 38. A plug member (plug) 55 is fixedly fitted into an inner circumferential surface of the small-diameter portion 13b by press fitting. The plug member 55 inhibits the lubricating oil from leaking to the external.

The iron-core rotor 17 is formed of magnetic material having a plurality of magnetic poles. An outer circumferential side of the iron-core rotor 17 constitutes bobbins each having a slot. (A coil wire of) A coil 18 is wound on the bobbin.

The commutator 21 is made of electrical conductive material and is formed in an annular shape. The commutator 21 is divided into segments. The number of the segments is equal to the number of poles of the iron-core rotor 17. Each of the segments of the commutator 21 is electrically connected to an end portion of the coil wire of the coil 18. That is, a tip of the end portion of the coil wire is sandwiched by a turn-back portion of the commutator 21 which is formed on an inner circumferential side of the coil 18, so that the commutator 21 is electrically connected to the electromagnetic coils 18.

The permanent magnets 14 and 15 are formed in a cylindrical shape (circular-tube shape), as a whole. The permanent magnets 14 and 15 have a plurality of magnetic poles along a circumferential direction thereof. An axial location of the permanent magnets 14 and 15 is deviated (offset) in the frontward direction from an axial location of the iron-core rotor 17. That is, with respect to the axial direction, a center of the permanent magnet 14 or 15 is located at a frontward site beyond a center of the iron-core rotor 17, as shown in FIG. 1. In other words, the stator 16 is closer to the center of the permanent magnet 14 or 15 than to the center of the iron-core rotor 17, with respect to the axial direction. Thereby, a front end portion of the permanent magnet 14, 15 overlaps with the commutator 21 and also an after-mentioned first brush 25a, 25b of the stator 16 and so on, in the radial direction.

Figure 7:
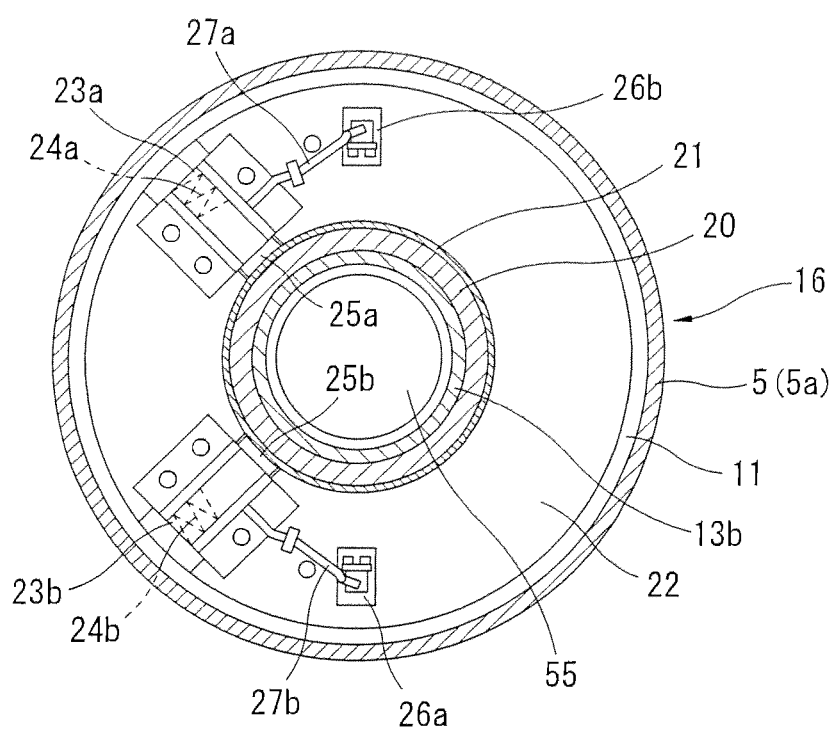
FIG. 7 is a sectional view of FIG. 1, taken along a line C-C.

As shown in FIG. 7, the stator 16 mainly includes a resin plate 22, a pair of resin holders 23a and 23b, a pair of first brushes 25a and 25b each functioning as a switching brush (commutator), inner and outer slip rings 26a and 26b, and harnesses 27a and 27b. The resin plate 22 is formed in a circular plate shape, and is formed integrally with an inner circumferential portion of the sealing plate 11. The pair of resin holders 23a and 23b are provided on an inside portion (cam-shaft-side portion) of the resin plate 22. The pair of first brushes 25a and 25b are received or accommodated respectively in the pair of resin holders 23a and 23b such that the first brushes 25a and 25b are able to slide in contact with the resin holders 23a and 23b in the radial direction. Thereby, a tip surface of each of the first brushes 25a and 25b is elastically in contact with an outer circumferential surface of the commutator 21 in the radial direction by a spring force of coil spring 24a, 24b. Each of the inner and outer power-feeding slip rings 26a and 26b is formed in an annular shape. The inner and outer power-feeding slip rings 26a and 26b are buried in and fixed to front end surfaces of the resin holders 23a and 23b under a state where outer end surfaces (front end surfaces) of the power-feeding slip rings 26a and 26b are exposed to the space S1. As shown in FIG. 1, the inner and outer power-feeding slip rings 26a and 26b are disposed at an identical axial location and are disposed at radially inner and outer locations in a manner of radially-double layout. The harness 27a electrically connects the first brush 25a with the slip ring 26b whereas the harness 27b electrically connects the first brush 25b to with the power-feeding slip ring 26a.

A positioning of the sealing plate 11 is given by a concave stepped portion formed in an inner circumference of the front end portion of the motor housing 5. The sealing plate 11 is fixed into the concave stepped portion of the motor housing 5 by caulking. A shaft insertion hole 11a is formed in the sealing plate 11 to pass through a center portion of the sealing plate 11 in the axial direction. One end portion of the motor output shaft 13 and so on are passing through the shaft insertion hole 11a.

The retaining member 28 is fixed to the cover main body 3a. The retaining member 28 is integrally molded by synthetic resin material. As shown in FIGS. 1 to 4, the retaining member 28 is substantially formed in an L-shape as viewed laterally, i.e., in cross section taken by a plane parallel to the axial direction and parallel to an extending direction of an after-mentioned power-feeding terminal strip 31. The retaining member 28 mainly includes a brush retaining portion 28a, a connector portion 28b, a bracket portion 28c, and a pair of power-feeding terminal strips 31 and 31. The brush retaining portion 28a is substantially in a cylindrical shape, and is inserted in the retaining hole 3d. The connector portion 28b is located on an upper end portion of the brush retaining portion 28a. The bracket portion 28c is formed integrally with the brush retaining portion 28a, and protrudes from one side surface of the brush retaining portion 28a in a direction perpendicular to the axial direction and perpendicular to the extending direction of the power-feeding terminal strip 31. Through the bracket portion 28c, the retaining member 28 is fixed to the cover main body 3a by a bolt. A major part of the pair of power-feeding terminal strips 31 and 31 is buried in the retaining member 28.

Figure 4:
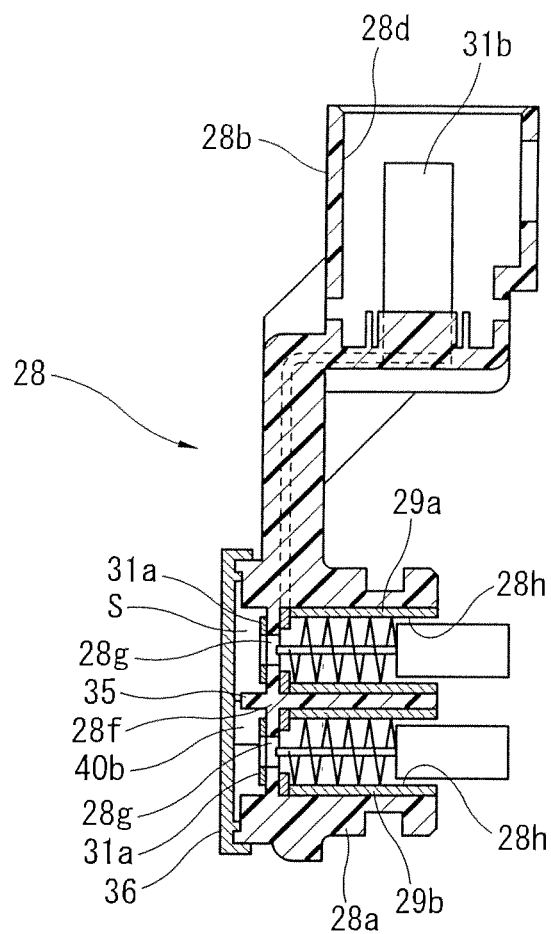
FIG. 4 is a sectional view of FIG. 3, taken along a line D-D.
Figure 5:
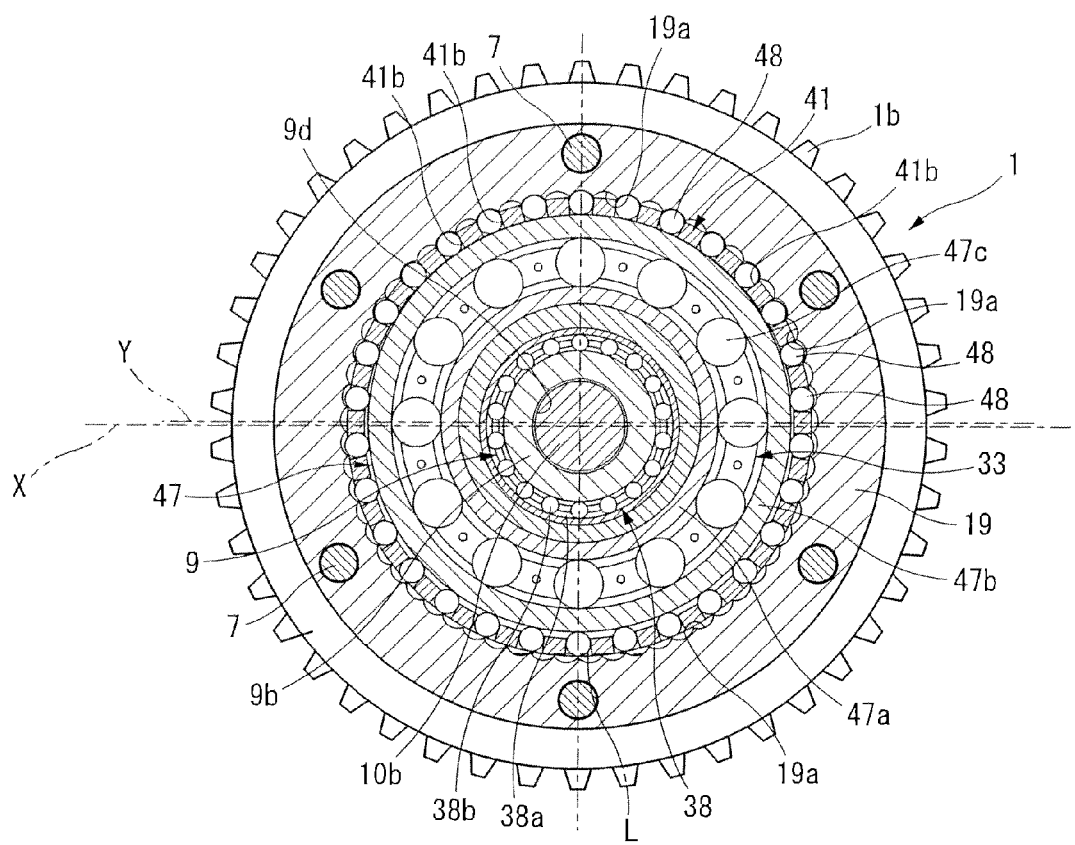
FIG. 5 is a sectional view of FIG. 1, taken along a line A-A.

The brush retaining portion 28a is provided to extend in a substantially horizontal direction (i.e., in the axial direction). As shown in FIGS. 1 and 4, the brush retaining portion 28a is formed with a pair of fixing holes 28h and 28h each formed in a cylindrical-column shape having its bottom, at upper and lower portions of an inside of the brush retaining portion 28a (i.e., at radially outer and inner portions with respect to an axis of the motor housing 5 or the phase change mechanism 4). The pair of fixing holes 28h and 28h extend in the axial direction of the cam shaft 2 and extend parallel to each other. A pair of brush guide portions 29a and 29b each having a square-tube shape are provided respectively in the fixing holes 28h and 28h of the brush retaining portion 28a, and are respectively fixed to the fixing holes 28h and 28h. A pair of power-feeding brushes 30a and 30b are received and retained respectively in the brush guide portions 29a and 29b to allow the power-feeding brushes 30a and 30b to slide in contact with the brush guide portions 29a and 29b in the axial direction. A tip surface of each of the power-feeding brushes 30a and 30b is in contact with the power-feeding slip ring 26a, 26b in the axial direction. Each of the power-feeding brushes 30a and 30b is formed in a square tube shape having a predetermined axial length, and corporates with the power-feeding slip rings 26a and 26b to define a part of the power-feeding mechanism.

Figure 3:
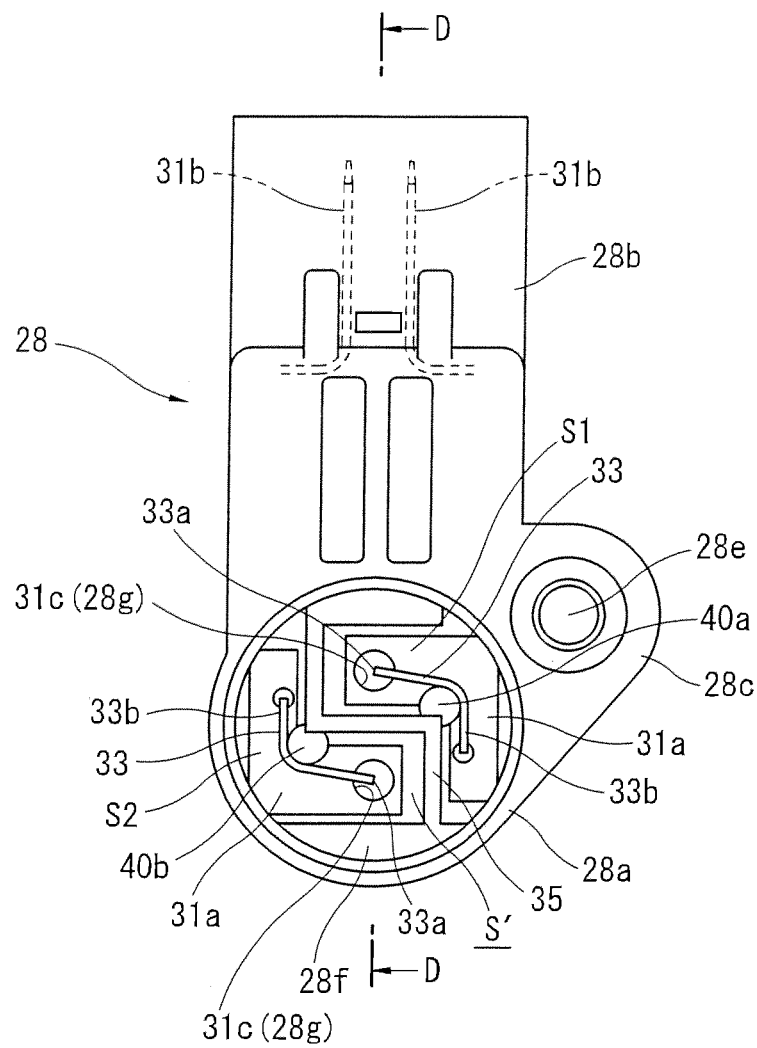
FIG. 3 is a front view of a retaining member according to the embodiment, under a state where a cap was detached from the retaining member.

The pair of fixing holes 28h and 28h have a bottom wall 28f located at a bottom portion of each fixing hole 28h. The bottom wall 28f is formed with through-holes 28g and 28g that pass through the bottom wall 28f in the axial direction. As shown in FIGS. 3 and 4, an after-mentioned pigtail harness 33 is inserted into the through-hole 28g. The space S is formed outside the bottom wall 28f, i.e., is located outside the bottom wall 28f with respect to the axial direction of the cam shaft 2. The through-holes 28g and 28g are exposed to (i.e., open to) the space S.

As shown in FIG. 3, the space S is formed in a circular shape. The depth of the space S (i.e., a length in the axial direction of the cam shaft 2) is set at a size enabling space S to absorb (accommodate) a bending or deflecting deformation of each pigtail harness 33 when the power-feeding brush 30a, 30b has backwardly moved (has fallen back) inside the brush guide portion 29a, 29b.

An axial opening of the space S which is shaped by the retaining member 28 is covered by a circular cap 36. The circular cap 36 is made of the same synthetic resin material as the retaining member 28. Accordingly, the space S is liquid-tightly closed by the circular cap 36.

Moreover, as shown in FIG. 3, a partition wall 35 is provided to the bottom wall 28f such that the partition wall 35 protrudes in the space S from the bottom wall 28f outwardly in the axial direction. The partition wall 35 is formed integrally with the bottom wall 28f. The partition wall 35 separates the space S into right and left space portions S1 and S2 as viewed in the axial direction of the cam shaft 2 such that the pair of right and left space portions S1 and S2 respectively correspond to locations of the fixing holes 28h and 28h.

The partition wall 35 is molded integrally with the retaining member 28 and is made of a synthetic resin material that is an insulating material. The partition wall 35 is bent in a substantially crank shape. That is, by the partition wall 35, the space S located on an outside surface (cap-side surface) of the bottom wall 28f is partitioned into the pair of space portions S1 and S2 each having an L-shape as viewed in the axial direction of the cam shaft 2. In other words, as shown in FIG. 3, the partition wall 35 is formed such that inner sides of the L-shapes of the two space portions S1 and S2 are combined with each other through the crank shape of the partition wall 35 (i.e., to sandwich the crank shape of the partition wall 35 therebetween).

The pair of power-feeding terminal strips 31 and 31 extend in the upper-lower direction, and extend parallel to each other. The pair of power-feeding terminal strips 31 and 31 are formed in a crank shape. One-side terminal (lower end portion) 31a for each of the power-feeding terminal strips 31 and 31 is positioned on and fastened to the outside surface of the bottom wall 28f to be exposed to the space S whereas another-side terminal (upper end portion) 31b for each of the power-feeding terminal strips 31 and 31 is introduced in a female fitting groove 28d of the connector portion 28b and protrudes from a bottom of the female fitting groove 28d, as shown in FIG. 1. Moreover, the another-side terminals 31b and 31b of the power-feeding terminal strips 31 and 31 are connected through a female connector and harnesses (not shown) to a control unit (not shown).

Each of the one-side terminals 31a and 31a is bent and has a plurality of contact portions. Specifically, as shown in FIG. 3, each of the one-side terminals 31a and 31a is formed in a substantially L-shape along the shape of the corresponding space portion S1 or S2, as viewed in the axial direction of the cam shaft 2. The one-side terminals 31a and 31a are in contact with the axially-outside surface of the bottom wall 28f such that inner sides (right-angle sides) of the L-shapes of the one-side terminals 31a and 31a are combined with each other through the crank shape of the partition wall 35. Each of the one-side terminals 31a and 31a is formed with an insertion hole 31c which is located in one end portion of the one-side terminal 31a and which passes through the one-side terminal 31a. The insertion holes 31c of the one-side terminals 31a and 31a have locations corresponding to (i.e., axially overlap with) the through-holes 28g and 28g. The pair of pigtail harnesses 33 and 33 are respectively inserted into the insertion holes 31c and 31c, and are bent by contacting the insertion holes 31c and 31c. It is noted that each of the insertion holes 31c and 31c functions as a first contact portion for the pigtail harness 33.

Protruding portions 40a and 40b are formed in a standing manner respectively at two outer-corner locations of the crank-shape of the partition wall 35 (i.e., at inner corners of the L-shapes of the one-side terminals 31a and 31a) such that the protruding portions 40a and 40b protrude in the space S from the bottom wall 28f frontward in the axial direction of the cam shaft 2. Each of these protruding portions 40a and 40b has a substantially cylindrical-column shape and is molded integrally with the retaining member 28. A height (i.e., protruding amount in the space S) of each of the protruding portions 40a and 40b is approximately equal to a height of the partition wall 35. An outer diameter of each of the protruding portions 40a and 40b is approximately equal to an inner diameter of the insertion hole 31c as shown in FIG. 3. It is noted that each of the protruding portions 40a and 40b functions as a second contact portion for the pigtail harness 33.

As shown in FIGS. 1 and 2, each of the power-feeding brushes 30a and 30b is formed in a substantially rectangular-parallelepiped shape. Each of a pair of second coil springs 32a and 32b is elastically disposed between a backend portion (a bottom-side end portion) of the power-feeding brush 30a, 30b and a hole bottom of the fixing hole 28h, i.e. an inside surface of the bottom wall 28f. The power-feeding brushes 30a and 30b are biased respectively toward the slip rings 26a and 26b by spring forces of the second coil springs 32a and 32b. The large-diameter oil seal 50 prevents lubricating oil from entering a gap between the slip ring 26a, 26b and the power-feeding brush 30a, 30b.

Moreover, one of the pair of pigtail harnesses 33 and 33 which can change in shape because of a flexibility thereof is disposed between the backend portion of the power-feeding brush 30a and one of the one-side terminals 31a and 31a. In the same manner, another of the pair of pigtail harnesses 33 and 33 which can change in shape because of a flexibility thereof is disposed between the backend portion of the power-feeding brush 30b and another of the one-side terminals 31a and 31a. As shown in FIG. 4, a length of each of the pigtail harnesses 33 and 33 is designed to restrict a maximum sliding position of the power-feeding brush 30a, 30b such that the power-feeding brush 30a, 30b is prevented from dropping out from the brush guide portion 29a, 29b when the power-feeding brush 30a, 30b has moved (risen) and slid in an axially-outward direction at the maximum by the biasing force of the coil spring 32a, 32b.

The one end portion 33a of each pigtail harness 33 is fixed to the backend portion of the power-feeding brush 30a, 30b by soldering whereas the another end portion 33b of each pigtail harness 33 passes through an external surface of the protruding portion 40a, 40b and is fixed to another end portion of the one-side terminal 31a by soldering (black circle). Accordingly, the power-feeding brush 30a, 30b is electrically connected to the one-side terminal 31a of the power-feeding terminal strip 31.

That is, as shown in FIGS. 3 and 4, the another end portion 33b of each of the pigtail harnesses 33 and 33 which has been drawn from the insertion hole 31c is wound around or hung on the external surface of the protruding portion 40a, 40b and thereby is bent at an approximately 90-degree angle. Under this state, the another end portion 33b is positioned and held. That is, the another end portion 33b of each of the pigtail harnesses 33 and 33 is fixed to the one-side terminal 31a under the state where (a portion near) the another end portion 33b has been bent along the L-shape of the one-side terminal 31a so as to make a detour. FIGS. 3 and 4 show a state obtained when the power-feeding brushes 30a and 30b disposed in the brush guide portions 29a and 29b have been biased in the rising direction by spring force of the second coil springs 32a and 32b but have not yet become in contact with the slip rings 26a and 26b.

At the time of assembly, a fore portion (slipping portion) of the power-feeding brush 30a, 30b becomes in contact with the corresponding slip ring 26a, 26b so that the power-feeding brush 30a, 30b backwardly moves or slides against the biasing force of the coil spring 32a, 32b. At this time, the pigtail harness 33 slightly sags such that a central portion of the pigtail harness 33 moves through the through-hole 28g and the insertion hole 31c. Thereby, the central portion of the pigtail harness 33 causes its deflective deformation and is absorbed in the space portion S1, S2. That is, a bending part of the pigtail harness 33 is increased to enlarge a bending curve thereof such that the bending part of the pigtail harness 33 bulges outwardly. In this embodiment, the bending part of each pigtail harness 33 is accommodated inside the space portion S1, S2 under the deflective state.

An annular (ring-shaped) seal member 34 is fitted into and held by an annular fitting groove which is formed on an outer circumference of a base portion side of the brush retaining portion 28a. The annular seal member 34 becomes elastically in contact with a tip surface of the cylindrical wall 3c to seal an inside of the brush retaining portion 28a when the brush retaining portion 28a is inserted into the retaining hole 3d.

The male connector (not shown) is inserted into the female fitting groove 28d which is located at an upper end portion of the connector portion 28b. The another-side terminals 31b and 31b which are exposed to the female fitting groove 28d of the connector portion 28b are electrically connected through the male connector to a control unit (not shown).

As shown in FIG. 3, the bracket portion 28c is formed in a substantially triangular shape and is formed with a bolt insertion hole 28e. The bolt insertion hole 28e located at one side of the brush retaining portion 28a axially passes through the bracket portion 28c. A bolt (not shown) is inserted through the bolt insertion hole 28e, and is screwed into a female threaded hole (not shown) formed in the cover main body 3a. Thereby, the retaining member 28 is fixed to the cover main body 3a through the bracket portion 28c.

The motor output shaft 13 and the eccentric shaft portion 39 are rotatably supported by the small-diameter ball bearing 37 and the needle bearing 38. The small-diameter ball bearing 37 is provided on an outer circumferential surface of a head-portion-side portion of the shaft portion 10b of the cam bolt 10. The needle bearing 38 is provided on an outer circumferential surface of the cylindrical portion 9b of the follower member 9, and is located axially adjacent to the small-diameter ball bearing 37.

The needle bearing 38 includes a cylindrical retainer 38a and a plurality of needle rollers 38b. The retainer 38a is formed in a cylindrical shape (circular-tube shape), and is fitted in an inner circumferential surface of the eccentric shaft portion 39 by press fitting. Each needle roller 38b is a rolling element supported rotatably inside the retainer 38a. The needle rollers 38b roll on the outer circumferential surface of the cylindrical portion 9b of the follower member 9.

The inner race of the small-diameter ball bearing 37 is fixed between a front end edge of the cylindrical portion 9b of the follower member 9 and the head portion 10a of the cam bolt 10 in a sandwiched state. On the other hand, an outer race of the small-diameter ball bearing 37 is fixedly fitted in a stepped diameter-enlarged portion of the inner circumferential surface of the eccentric shaft portion 39 by press fitting. The outer race of the small-diameter ball bearing 37 is axially positioned by contacting a step edge (barrier) formed in the stepped diameter-enlarged portion of the inner circumferential surface of the eccentric shaft portion 39.

A small-diameter oil seal 46 is provided between the outer circumferential surface of the motor output shaft 13 (eccentric shaft portion 39) and an inner circumferential surface of the extending portion 5d of the motor housing 5. The oil seal 46 prevents lubricating oil from leaking from an inside of the speed-reduction mechanism 8 into the electric motor 12. The oil seal 46 separates the electric motor 12 from the speed-reduction mechanism 8 by a searing function of the oil seal 46.

The control unit detects a current operating state of the engine on the basis of information signals derived from various kinds of sensors and the like, such as a crank angle sensor, an air flow meter, a water temperature sensor and an accelerator opening sensor (not shown). Thereby, the control unit controls the engine. Moreover, the control unit performs a rotational control for the motor output shaft 13 by supplying electric power to the coils 18. Thereby, the control unit controls a relative rotational phase of the cam shaft 2 to the timing sprocket 1, through the speed-reduction mechanism 8.

As shown in FIGS. 1 and 4, the speed-reduction mechanism 8 is mainly constituted by the eccentric shaft portion 39, a medium-diameter ball bearing 47, the rollers 48, the retainer 41, and the follower member 9 formed integrally with the retainer 41. The eccentric shaft portion 39 conducts an eccentric rotational motion. The medium-diameter ball bearing 47 is provided on an outer circumference of the eccentric shaft portion 39. The rollers 48 are provided on an outer circumference of the medium-diameter ball bearing 47. The retainer 41 retains (guides) the rollers 48 along a rolling direction of the rollers 48, and permits a radial movement of each roller 48.

An outer circumferential surface of the eccentric shaft portion 39 includes a cam surface 39a. The cam surface 39a of the eccentric shaft portion 39 has a center (axis) Y which is eccentric (deviated) slightly from a shaft center X of the motor output shaft 13 in the radial direction.

Substantially whole of the medium-diameter ball bearing 47 overlaps with the needle bearing 38 in the radial direction, i.e., the medium-diameter ball bearing 47 is located approximately within an axial existence range of the needle bearing 38. The medium-diameter ball bearing 47 includes an inner race 47a, an outer race 47b, and a ball(s) 47c interposed between both the races 47a and 47b. The inner race 47a is fixed to the outer circumferential surface of the eccentric shaft portion 39 by press fitting. The outer race 47b is not fixed in the axial direction, and thereby is in an axially freely-movable state. That is, one of axial end surfaces of the outer race 47b which is closer to the electric motor 12 is not in contact with any member whereas another of the axial end surfaces of the outer race 47b faces an inside surface of the retainer 41 to have a first clearance (minute clearance) C between the another of the axial end surfaces of the outer race 47b and the inside surface of the retainer 41. Moreover, an outer circumferential surface of the outer race 47b is in contact with an outer circumferential surface of each of the rollers 48 so as to allow the rolling motion of each roller 48. An annular second clearance C1 is formed on the outer circumferential surface of the outer race 47b. By virtue of the second clearance C1, whole of the medium-diameter ball bearing 47 can move in the radial direction in response to an eccentric rotation (of the outer circumferential surface of the large-diameter portion 39b) of the eccentric shaft portion 39, i.e., can perform an eccentric movement.

Each of the rollers 48 is formed of iron-based metal. With the eccentric movement of the medium-diameter ball bearing 47, the respective rollers 48 move in the radial direction and are fitted in the internal teeth 19a of the internal-teeth constituting portion 19. Also, with the eccentric movement of the medium-diameter ball bearing 47, the rollers 48 are forced to do a swinging motion in the radial direction while being guided in the circumferential direction by both side edges of the roller-retaining holes 41b of the retainer 41. That is, the rollers 48 are moved closer to the internal teeth 19a and are moved away from the internal teeth 19a, repeatedly, by the eccentric movement of the medium-diameter ball bearing 47.

Lubricating oil is supplied into the speed-reduction mechanism 8 by a lubricating-oil supplying means (supplying section). This lubricating-oil supplying means includes an oil supply passage, an oil supply hole 51, an oil hole 52 having a small hole diameter, and three oil discharge holes (not shown) each having a large hole diameter. The oil supply passage is formed inside the bearing 42 of the cylinder head 01. Lubricating oil is supplied from a main oil gallery (not shown) to the oil supply passage. The oil supply hole 51 is formed inside the cam shaft 2 to extend in the axial direction as shown in FIG. 1. The oil supply hole 51 communicates though a groove(s) with the oil supply passage. The oil hole 52 is formed inside the follower member 9 to pass through the follower member 9 in the axial direction. One end of the oil hole 52 is open to the oil supply hole 51, and another end of the oil hole 52 is open to a region near the needle bearing 38 and the medium-diameter ball bearing 47. The three oil discharge holes are formed inside the follower member 9 to pass through the follower member 9 in the same manner.

By the lubricating-oil supplying means, lubricating oil is supplied to the accommodating space 44 and held in the accommodating space 44. Thereby, the lubricating oil lubricates the medium-diameter ball bearing 47 and the rollers 48. Moreover, the lubricating oil flows to the inside of the eccentric shaft portion 39 and the inside of the motor output shaft 13 so that moving elements such as the needle bearing 38 and the small-diameter ball bearing 37 are lubricated. It is noted that the small-diameter oil seal 46 inhibits the lubricating oil held in the accommodating space 44 from leaking to the inside of the motor housing 5.

Next, operations in this embodiment according to the present invention will now be explained. At first, when the crankshaft of the engine is drivingly rotated, the timing sprocket 1 is rotated through the timing chain 42. This rotative force is transmitted through the internal-teeth constituting portion 19 and the female-thread constituting portion 6 to the motor housing 5. Thereby, the electric motor 12 rotates in synchronization. On the other hand, the rotative force of the internal-teeth constituting portion 19 is transmitted through the rollers 48, the retainer 41 and the follower member 9 to the cam shaft 2. Thereby, the cam of the cam shaft 2 opens and closes the intake valve.

Under a predetermined engine-operating state after the start of the engine, the control unit supplies electric power to the coils 18 of the electric motor 12 through the terminal strips 31 and 31, the pigtail harnesses 33 and 33, the power-feeding brushes 30a and 30b and the slip rings 26a and 26b and the like. Thereby, the rotation of the motor output shaft 13 is driven. This rotative force of the motor output shaft 13 is transmitted through the speed-reduction mechanism 8 to the cam shaft 2 so that a reduced rotation is transmitted to the cam shaft 2.

That is, (the outer circumferential surface of) the eccentric shaft portion 39 eccentrically rotates in accordance with the rotation of the motor output shaft 13. Thereby, each roller 48 rides over (is disengaged from) one internal tooth 19a of the internal-teeth constituting portion 19 and moves to the other adjacent internal tooth 19a with its rolling motion while being radially guided by the roller-retaining holes 41b of the retainer 41, every one rotation of the motor output shaft 13. By repeating this motion sequentially, each roller 48 rolls in the circumferential direction under a contact state. By this contact rolling motion of each roller 48, the rotative force is transmitted to the follower member 9 while the rotational speed of the motor output shaft 13 is reduced. A speed reduction rate which is obtained at this time can be set at any value by adjusting the number of rollers 48 and the like.

Accordingly, the cam shaft 2 rotates in the forward or reverse direction relative to the timing sprocket 1 so that the relative rotational phase between the cam shaft 2 and the timing sprocket 1 is changed. Thereby, opening and closing timings of the intake valve are controllably changed to its advance or retard side.

As shown in FIG. 6, a maximum positional restriction (angular position limitation) for the forward/reverse relative rotation of cam shaft 2 to the timing sprocket 1 is performed when one of respective lateral surfaces (circumferentially-opposed surfaces) of the stopper convex portion 61d becomes in contact with the corresponding one of the circumferentially-opposed surfaces 2c and 2d of the stopper concave groove 2b.

Specifically, when the follower member 9 rotates (at a higher speed) in the same rotational direction as that of the timing sprocket 1 with the eccentric rotational motion of the eccentric shaft portion 39, one lateral surface of the stopper convex portion 61d becomes in contact with the surface 2c of the stopper concave groove 2b so that a further relative rotation of the follower member 9 in the same direction is prohibited. Thereby, the relative rotational phase of the cam shaft 2 to the timing sprocket 1 is changed to the advance side at maximum.

On the other hand, when the follower member 9 rotates in a relatively opposite rotational direction to that of the timing sprocket 1 (i.e., at a lower speed than the timing sprocket 1), another lateral surface of the stopper convex portion 61d becomes in contact with the surface 2d of the stopper concave groove 2b so that a further rotation of the follower member 9 in the relatively-opposite direction is prohibited. Thereby, the relative rotational phase of the cam shaft 2 to the timing sprocket 1 is changed to the retard side at maximum.

As a result, the opening and closing timings of the intake valve can be changed to the advance side or the retard side up to its maximum. Therefore, a fuel economy and an output performance of the engine are improved.

In this embodiment, at the time of assembly of the respective structural components, the retaining member 28 is attached to the cover member 3 to cause the power-feeding brushes 30a and 30b to become in contact with the corresponding slip rings 26a and 26b from the outside of the motor housing 5 in the axial direction. At this time, the respective power-feeding brushes 30a and 30b are pressed against the biasing forces of the coil springs 32a and 32b. With the backward movement of the respective brushes 30a and 30b, the substantially central portions of the pigtail harnesses 33 and 33 are changed in shape in a deflective manner while moving in the through-holes 28g and 28g and the insertion holes 31c and 31c of the one-side terminals 31a and 31a. Hence, as mentioned above, the central portion of each of the pigtail harnesses 33 and 33 is absorbed (accommodated) inside the corresponding space portion S1, S2.

At this time, the substantially central portion of each of the pigtail harnesses 33 and 33 is not freely deflected in multiple directions because (the portion near) the another end portion 33b of each of the pigtail harnesses 33 and 33 was previously hung (put) on the external surface of the protruding portion 40a, 40b to be kept in the substantially L-shape, as mentioned above. That is, at the time of assembly, each of the pigtail harnesses 33 and 33 slightly moves from the external surface of the protruding portion 40a, 40b in a substantially horizontal direction while substantially maintaining its L-shape. Thereby, each of the pigtail harnesses 33 and 33 gets away from the external surface of the protruding portion 40a, 40b to become in non-contact with the protruding portion 40a, 40b or become in a state where a part of the pigtail harness 33 is slightly (weakly) in contact with the protruding portion 40a, 40b. Under such a state, (the portion near) the another end portion 33b of each of the pigtail harnesses 33 and 33 has a loose (rounded) L-shape.

Accordingly, a range from the central portion of the pigtail harness 33 to the another end portion 33b of the pigtail harness 33 maintains the L-shape without contacting any member or by slightly contacting the external surface of the protruding portion 40a, 40b so that this range of the pigtail harness 33 is accommodated and supported loosely (to have an enlarged clearance) inside the space portion S1, S2.

Therefore, even if a vibration (oscillation) is transmitted to the pigtail harnesses 33 and 33 due to an alternating torque or the like transmitted to the cam shaft 2 during operation of the engine, a repeated stress does not occur in the pigtail harnesses 33 and 33. Hence, a fatigue of the pigtail harness 33 can be prevented from occurring over a long term, so that a reduction of durability of the pigtail harness 33 can be suppressed.

Because both the space portions S1 and S2 are separated from each other by the partition wall 35, a contact between both of the pigtail harnesses 33 and 33 respectively accommodated in the corresponding space portions S1 and S2 can be avoided as mentioned above. Accordingly, an electrical short circuit between the pigtail harnesses 33 and 33 can be suppressed. Also, a disconnection (breaking) of each pigtail harness 33 can be inhibited from occurring due to a sliding friction thereof.

Although the invention has been described above with reference to certain embodiments of the invention, the invention is not limited to the embodiments described above. Modifications and variations of the embodiments described above will occur to those skilled in the art in light of the above teachings.

For example, the shape and/or size of the space S, the space portion S1 and/or the space portion S2 can be changed to any desired shape and/or size by changing the brush retaining portion 28a and/or the partition wall 35.

Moreover, the shape of the one-side terminal 31a for the terminal strip 31 can be changed to a desired shape.

[Configurations]

Some technical configurations obtainable from the above embodiments according to the present invention will now be listed as follows.

[a] A valve-timing control apparatus for an internal combustion engine, comprising: a drive rotating member (e.g. 1 in the drawings) configured to receive a rotational force from a crankshaft; a motor housing (5) fixed to the drive rotating member (1) and formed with an accommodating space therein; a permanent magnet (14, 15) provided along an inner circumference of the accommodating space of the motor housing (5), the permanent magnet (14, 15) having a plurality of magnetic poles in a circumferential direction thereof; a rotor (17) provided inside the permanent magnet (14, 15) and configured to rotate relative to the permanent magnet (14, 15), wherein a coil (18) is wound on the rotor (17) and is configured to form a plurality of magnetic poles in a circumferential direction of the rotor (17) by energization; a transmitting mechanism (8) configured to transmit a rotational force of the rotor (17) to a cam shaft (2); a switching brush (25a, 25b) mounted on the motor housing (5) and configured to switch the energization of the coil (18); a power-feeding brush (30a, 30b) provided to one of the motor housing (5) and a fixed member (3) and configured to feed electric power to the switching brush (25a, 25b); a slip ring (26a, 26b) provided to another of the motor housing (5) and the fixed member (3), the power-feeding brush (30a, 30b) being in contact with the slip ring (26a, 26b); a pigtail harness (33) connecting the power-feeding brush (30a, 30b) with a power-feeding terminal (31, 31); and contact portions (31c, 40a, 40b) bending the pigtail harness (33) at a plurality of spots of the pigtail harness (33) by contact with the pigtail harness (33).

[b] The valve-timing control apparatus as described in the item [a], wherein a retaining member (e.g. 28 in the drawings) including a brush retaining portion (28a) is attached to the fixed member (3), the brush retaining portion (28a) retains the power-feeding brush (30a, 30b) to allow the power-feeding brush (30a, 30b) to slide relative to the brush retaining portion (28a), the brush retaining portion (28a) includes a protruding portion (40a, 40b) formed to extend from an outside surface of the brush retaining portion (28a) in a sliding direction of the power-feeding brush (30a, 30b), one end portion (33a) of the pigtail harness (33) is connected with the power-feeding brush (30a, 30b), and another end portion (33b) of the pigtail harness (33) passes through an inside of the brush retaining portion (28a) and an external surface of the protruding portion (40a, 40b) and is connected with the power-feeding terminal (31, 31).

[c] The valve-timing control apparatus as described in the item [b], wherein the protruding portion (e.g. 40a, 40b in the drawings) is substantially in a cylindrical shape.

[d] The valve-timing control apparatus as described in the item [b], wherein the brush retaining portion (e.g. 28a in the drawings) retains a first power-feeding brush (30a, 30b) connected with a positive pole and a second power-feeding brush (30a, 30b) connected with a negative pole, the brush retaining portion (28a) includes a pair of protruding portions (40a, 40b) each formed to extend from the outside surface of the brush retaining portion (28a) in the sliding direction of the power-feeding brush (30a, 30b), and two pigtail harnesses (33) are respectively hung on the external surfaces of the pair of protruding portions (40a, 40b) and respectively connected with a pair of power-feeding terminals (31, 31) for energization.

[e] The valve-timing control apparatus as described in the item [d], wherein the brush retaining portion (e.g. 28a in the drawings) includes a partition wall (35) formed to protrude from an outside surface of a bottom wall (28f) of the brush retaining portion (28a), the partition wall (35) is bent in a substantially crank shape such that a pair of substantially L-shaped grooves (S1, S2) are combined with each other through the partition wall (35), and the pair of protruding portions (40a, 40b) are respectively provided at two corner locations of the partition wall (35).

[f] The valve-timing control apparatus as described in the item [e], wherein a part of each of the power-feeding terminals (e.g. 31, 31 in the drawings) is buried in and fixed to the retaining member (28).

[g] The valve-timing control apparatus as described in the item [f], wherein space portions (e.g. S1, S2 in the drawings)

are formed on the outside surface of the bottom wall (28f) of the brush retaining portion (28a), a part of each of the power-feeding terminals (31, 31) is exposed to the corresponding space portion (S1, S2), and an opening of each of the space portions (S1, S2) is liquid-tightly closed by a cap member (36).

[h] Alternatively, a valve-timing control apparatus for an internal combustion engine, wherein a valve timing of the internal combustion engine is varied by energizing an electric motor (e.g. 12 in the drawings) by way of a slip ring (26a, 26b) and a power-feeding brush (30a, 30b), the valve-timing control apparatus comprising: a retaining member (28) retaining the power-feeding brush (30a, 30b) to allow the power-feeding brush (30a, 30b) to slide relative to the retaining member (28); and a pigtail harness (33) electrically connecting the power-feeding brush (30a, 30b) with a connection terminal (31, 31), wherein the retaining member (28) is formed with a contact portion, one end portion (33a) of the pigtail harness (33) is connected with the power-feeding brush (30a, 30b), and another end portion (33b) of the pigtail harness (33) is wound around an external surface of the contact portion and is connected with the connection terminal (31, 31).

[i] The valve-timing control apparatus as described in the item [h], wherein the connection terminal (e.g. 31, 31 in the drawings) is made of a conductive metallic plate and fixed to an inside of the retaining member (28).

[j] Alternatively, a power-feeding mechanism used in a valve-timing control apparatus for an internal combustion engine, wherein the valve-timing control apparatus includes a power-feeding brush (e.g. 30a, 30b in the drawings) configured to move in an axial direction such that a tip portion of the power-feeding brush (30a, 30b) become in contact with a slip ring (26a, 26b), wherein a valve timing of the internal combustion engine is varied by drivingly rotating an electric motor by means of power supply from the slip ring (26a, 26b), the power-feeding mechanism comprising: a retaining member (28) retaining the power-feeding brush (30a, 30b) therein to allow the power-feeding brush (30a, 30b) to slide relative to the retaining member (28); a protruding portion (40a, 40b) formed to extend from an outside surface of the retaining member (28) in a sliding direction of the power-feeding brush (30a, 30b); and a pigtail harness (33), wherein one end portion (33a) of the pigtail harness (33) is connected with the power-feeding brush (30a, 30b), wherein another end portion (33b) of the pigtail harness (33) passes through an inside of the retaining member (28) and an external surface of the protruding portion (40a, 40b) and is connected with a connection terminal (31, 31).

As a representative advantageous effect according to such technical configurations, an operating efficiency for assembly of structural members such as the power-feeding brush can be improved while ensuring a durability of the pigtail harness.

This application is based on prior Japanese Patent Application No. 2013-140285 filed on Jul. 4, 2013. The entire contents of this Japanese Patent Application are hereby incorporated by reference.

The scope of the invention is defined with reference to the following claims.

What is claimed is:

1. A valve-timing control apparatus for an internal combustion engine, comprising:
   a drive rotating member configured to receive a rotational force from a crankshaft;
   a motor housing fixed to the drive rotating member and formed with an accommodating space therein;
   a permanent magnet provided along an inner circumference of the accommodating space of the motor housing, the permanent magnet having a plurality of magnetic poles in a circumferential direction thereof;
   a rotor provided inside the permanent magnet and configured to rotate relative to the permanent magnet, wherein a coil is wound on the rotor and is configured to form a plurality of magnetic poles in a circumferential direction of the rotor by energization;
   a transmitting mechanism configured to transmit a rotational force of the rotor to a cam shaft;
   a switching brush mounted on the motor housing and configured to switch the energization of the coil;
   a power-feeding brush provided to one of the motor housing and a fixed member and configured to feed electric power to the switching brush;
   a slip ring provided to another of the motor housing and the fixed member, the power-feeding brush being in contact with the slip ring;
   a pigtail harness connecting the power-feeding brush with a power-feeding terminal; and
   contact portions bending the pigtail harness at a plurality of spots of the pigtail harness by contact with the pigtail harness,
   wherein the contact portions are formed such that the pigtail harness gets in contact with at least one of the contact portions or gets away from the at least one of the contact portions in accordance with a movement of the power-feeding brush,
   wherein one of the contact portions has a cylindrical shape, and the pigtail harness is bent and has a substantially L-shape by being wound around the cylindrically-shaped contact portion, and
   wherein a portion of the cylindrically-shaped contact portion which the pigtail harness is wound around is a bending point at which the pigtail harness is bent to the substantially L-shape.

2. The valve-timing control apparatus as claimed in claim 1, wherein
   a retaining member including a brush retaining portion is attached to the fixed member,
   the brush retaining portion retains the power-feeding brush to allow the power-feeding brush to slide relative to the brush retaining portion,
   the cylindrically-shaped contact portion is a protruding portion formed to extend from an outside surface of the brush retaining portion in a sliding direction of the power-feeding brush,
   one end portion of the pigtail harness is connected with the power-feeding brush, and
   another end portion of the pigtail harness passes through an inside of the brush retaining portion and an external surface of the protruding portion and is connected with the power-feeding terminal.

3. The valve-timing control apparatus as claimed in claim 2, wherein
   the brush retaining portion retains a first power-feeding brush connected with a positive pole and a second power-feeding brush connected with a negative pole,
   the brush retaining portion includes a pair of protruding portions each formed to extend from the outside surface of the brush retaining portion in the sliding direction of the power-feeding brush, and two pigtail harnesses are respectively hung on the external surfaces of the pair of protruding portions and respectively connected with a pair of power-feeding terminals for energization.

4. The valve-timing control apparatus as claimed in claim 3, wherein
the brush retaining portion includes a partition wall formed to protrude from an outside surface of a bottom wall of the brush retaining portion,
the partition wall is bent in a substantially crank shape such that a pair of substantially L-shaped grooves are combined with each other through the partition wall, and
the pair of protruding portions are respectively provided at two corner locations of the partition wall.

5. The valve-timing control apparatus as claimed in claim 4, wherein
a part of each of the power-feeding terminals is buried in and fixed to the retaining member.

6. The valve-timing control apparatus as claimed in claim 5, wherein
space portions are formed on the outside surface of the bottom wall of the brush retaining portion,
a part of each of the power-feeding terminals is exposed to the corresponding space portion, and
an opening of each of the space portions is liquid-tightly closed by a cap member.

7. A valve-timing control apparatus for an internal combustion engine, wherein a valve timing of the internal combustion engine is varied by energizing an electric motor by a slip ring and a power-feeding brush, the valve-timing control apparatus comprising:
a retaining member retaining the power-feeding brush to allow the power-feeding brush to slide relative to the retaining member; and
a pigtail harness electrically connecting the power-feeding brush with a connection terminal, wherein
the retaining member is formed with a contact portion,
one end portion of the pigtail harness is connected with the power-feeding brush,
another end portion of the pigtail harness is wound around an external surface of the contact portion and is connected with the connection terminal,
the contact portion is formed such that the pigtail harness gets in contact with the contact portion or gets away from the contact portion in accordance with a movement of the power-feeding brush,
the contact portion has a cylindrical shape, and the pigtail harness is bent and has a substantially L-shape by being wound around the external surface of the cylindrically-shaped contact portion, and
a portion of the cylindrically-shaped contact portion which the pigtail harness is wound around is a bending point at which the pigtail harness is bent to the substantially L-shape.

8. The valve-timing control apparatus as claimed in claim 7, wherein
the connection terminal is made of a conductive metallic plate and fixed to an inside of the retaining member.

9. A power-feeding mechanism used in a valve-timing control apparatus for an internal combustion engine,
wherein the valve-timing control apparatus includes a power-feeding brush configured to move in an axial direction such that a tip portion of the power-feeding brush become in contact with a slip ring, wherein a valve timing of the internal combustion engine is varied by drivingly rotating an electric motor by a power supply from the slip ring,
the power-feeding mechanism comprising:
a retaining member retaining the power-feeding brush therein to allow the power-feeding brush to slide relative to the retaining member;
a protruding portion formed to extend from an outside surface of the retaining member in a sliding direction of the power-feeding brush; and
a pigtail harness,
wherein one end portion of the pigtail harness is connected with the power-feeding brush,
wherein another end portion of the pigtail harness passes through an inside of the retaining member and an external surface of the protruding portion and is connected with a connection terminal,
wherein the protruding portion is formed such that the pigtail harness gets in contact with the external surface of the protruding portion or gets away from the external surface of the protruding portion in accordance with a movement of the power-feeding brush,
wherein the protruding portion has a cylindrical shape, and the pigtail harness is bent and has a substantially L-shape by being wound around the cylindrically-shaped protruding portion, and
wherein a portion of the cylindrically-shaped protruding portion which the pigtail harness is wound around is a bending point at which the pigtail harness is bent to the substantially L-shape.

* * * * *